US005532672A

United States Patent [19]
Plazarin

[11] Patent Number: 5,532,672
[45] Date of Patent: Jul. 2, 1996

[54] VEHICLE LEVEL ALARM

[76] Inventor: James J. Plazarin, 209 First St., P.O. Box 203, Yatesboro, Pa. 16263

[21] Appl. No.: 348,814

[22] Filed: Nov. 28, 1994

[51] Int. Cl.$^6$ .............................. B60Q 1/00; G08B 21/00
[52] U.S. Cl. ...................... 340/440; 340/689; 200/61.52; 200/61.45 R; 200/52 A
[58] Field of Search .................... 340/440, 689, 340/683, 566, 665; 200/61.45 R, 61.52, 52 A, 61.51; 73/1 DV, 1 D

[56] References Cited

U.S. PATENT DOCUMENTS

| | | | |
|---|---|---|---|
| 3,660,840 | 5/1972 | Plofchan | 340/440 |
| 3,804,435 | 4/1974 | See et al. | 280/733 |
| 3,846,781 | 11/1974 | Smith | 340/689 |
| 3,848,750 | 11/1974 | Hoge | 340/689 |
| 4,016,535 | 4/1977 | Dinlocker | 200/61.45 M |
| 4,145,682 | 3/1979 | Cook | 340/689 |
| 4,435,907 | 3/1984 | Okuyama et al. | 340/689 |
| 4,700,479 | 10/1987 | Saito et al. | 33/366 |
| 4,952,908 | 8/1990 | Sanner | 340/431 |

*Primary Examiner*—Donnie L. Crosland
*Attorney, Agent, or Firm*—Richard C. Litman

[57] ABSTRACT

A vehicle tilt alarm system including a tilt angle responsive switch having a pendulum that can swing to make contact with conductive bolts provided on either side of the pendulum's pivot point. The amount of the protrusion of the bolts into the pendulum housing can be adjusted, thereby allowing the user to set the angle of vehicle tilt at which the switch will activate the alarm system. The switch is incorporated in an circuit including an alarm device such as a buzzer or flashing light. The alarm system is mounted on a vehicle whereby the tilting of the vehicle past a predetermined angle will activate the alarm system, thus informing the vehicle operator that the vehicle is dangerously close to rolling over.

10 Claims, 3 Drawing Sheets

VEHICLE LEVEL ALARM

BACKGROUND OF THE INVENTION

1. Field of the Invention

The present invention relates to an alarm system for warning the driver of a vehicle when his vehicle is dangerously close to tipping over because his vehicle is positioned on too steep an incline.

2. Description of the Prior Art

Vehicles such as earthmoving equipment, including bulldozers, backhoes, and graders, and agricultural machinery, including harvesters, tractors, and lawn mowers, are frequently required to operate on steeply inclined surfaces such as hillsides and embankments. It is very difficult for a vehicle operator to determine visually if an incline is steep enough to cause his vehicle to roll over when the vehicle is travelling transversely to the downhill direction. To warn the vehicle operator that his vehicle is on too steep a slope and dangerously close to rolling over, many warning systems have been proposed in the prior art.

U.S. Pat. No. 3,804,435, issued to See et al., shows a vehicle roll-over safety system which includes inflatable bags that protect the vehicle operator as the vehicle rolls over. The inflatable bags are activated by a mercury switch that is responsive to the tilting of the vehicle.

U.S. Pat. No. 3,846,781, issued to Smith, shows a pendulum slope indicator that indicates to the vehicle operator the angle at which his vehicle is tilted relative to the horizontal. Also, when the vehicle is tilted laterally at an extreme angle, the pendulum makes an electrical contact to turn on a warning light. The Smith system has the drawback that the angle at which the warning light is turned on cannot be adjusted. Therefore the slope indicator of Smith cannot be transferred to another vehicle whose center of gravity is at a different height above the plane defined by the vehicles wheels or tracks, than the one for which the slope indicator was designed. Further there is no provision for a steady tip-over alarm which would generate a very loud, continuous noise to attract the attention of other people in the area in the event the vehicle rolls over.

U.S. Pat. No. 3,848,750, issued to Hoge, shows a crane tip alarm wherein a pendulum carrying a light source is positioned directly above a light detector. Relative movement of the pendulum interrupts the shining of the light beam onto the detector, thus causing an alarm. In addition, a conductor attached to the pendulum can make contact with an annular conductor surrounding the pendulum to also cause an alarm. The Hoge device causes an alarm even with the slightest deviation of the crane platform from the horizontal, and its sensitivity is not adjustable in contrast to the present device. Further there is no provision for a steady tip-over alarm which would generate a very loud, continuous noise to attract the attention of other people in the area in the event the vehicle rolls over.

U.S. Pat. No. 4,016,535, issued to Dinlocker, shows a tilt alarm wherein an alteration in the magnetic field surrounding a reed switch, caused by relative movement of a pendulum composed of a permanent magnet, precipitates the opening of the reed switch which in turn activates an alarm. The Dinlocker device requires a bleed current to flow through the reed switch under normal conditions, thus leading to an undesirable drain on the power supply. In addition, the angle at which the Dinlocker device generates an alarm is not adjustable in contrast to the present invention.

U.S. Pat. No. 4,145,682, issued to Cook, shows a tilt alarm using two mercury switches. The Cook system suffers from the drawback that it requires the use of a hazardous material namely mercury.

U.S. Pat. No. 4,700,479, issued to Saito et al., shows a tilt alarm having a magnetically damped pendulum. The pendulum has a reflective pattern on its surface which is illuminated by a light source. A photo-sensor receives the light reflected by the reflective pattern, and an alarm is generated when the light radiation to the photo-sensor is interrupted by relative movement of the pendulum. The Saito et al. device suffers the drawback that the angle at which the device generates an alarm is not adjustable in contrast to the present invention.

U.S. Pat. No. 4,952,908, issued to Sanner, shows a trailer stability monitor using two mercury switches. The Sanner system suffers from the drawback that it requires the use of a hazardous material namely mercury.

None of the above inventions and patents, taken either singly or in combination, is seen to describe the instant invention as claimed.

SUMMARY OF THE INVENTION

The present invention is a switch responsive to the angle to which it is tilted. The switch can be incorporated in an alarm system mounted on a vehicle whereby the tilting of the vehicle past a predetermined angle will activate the alarm system, thus informing the vehicle operator that the vehicle is dangerously close to rolling over. The switch includes a pendulum that can swing to make contact with conductive bolts provided on either side of the pendulum's pivot point. The amount of the protrusion of the bolts into the pendulum housing can be adjusted, thereby allowing the user to set the angle of vehicle tilt at which the switch will activate the alarm system.

Accordingly, it is a principal object of the invention to provide a tilt alarm system which allows for user adjustment of the tilt angle at which an alarm is generated.

It is another object of the invention to provide a tilt alarm system that does not require the use of hazardous materials.

It is a further object of the invention to provide a tilt alarm system that can be readily installed on existing vehicles.

Still another object of the invention is to provide a tilt alarm system that will not generate a false alarm due to roughness of the terrain being traversed by the vehicle.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
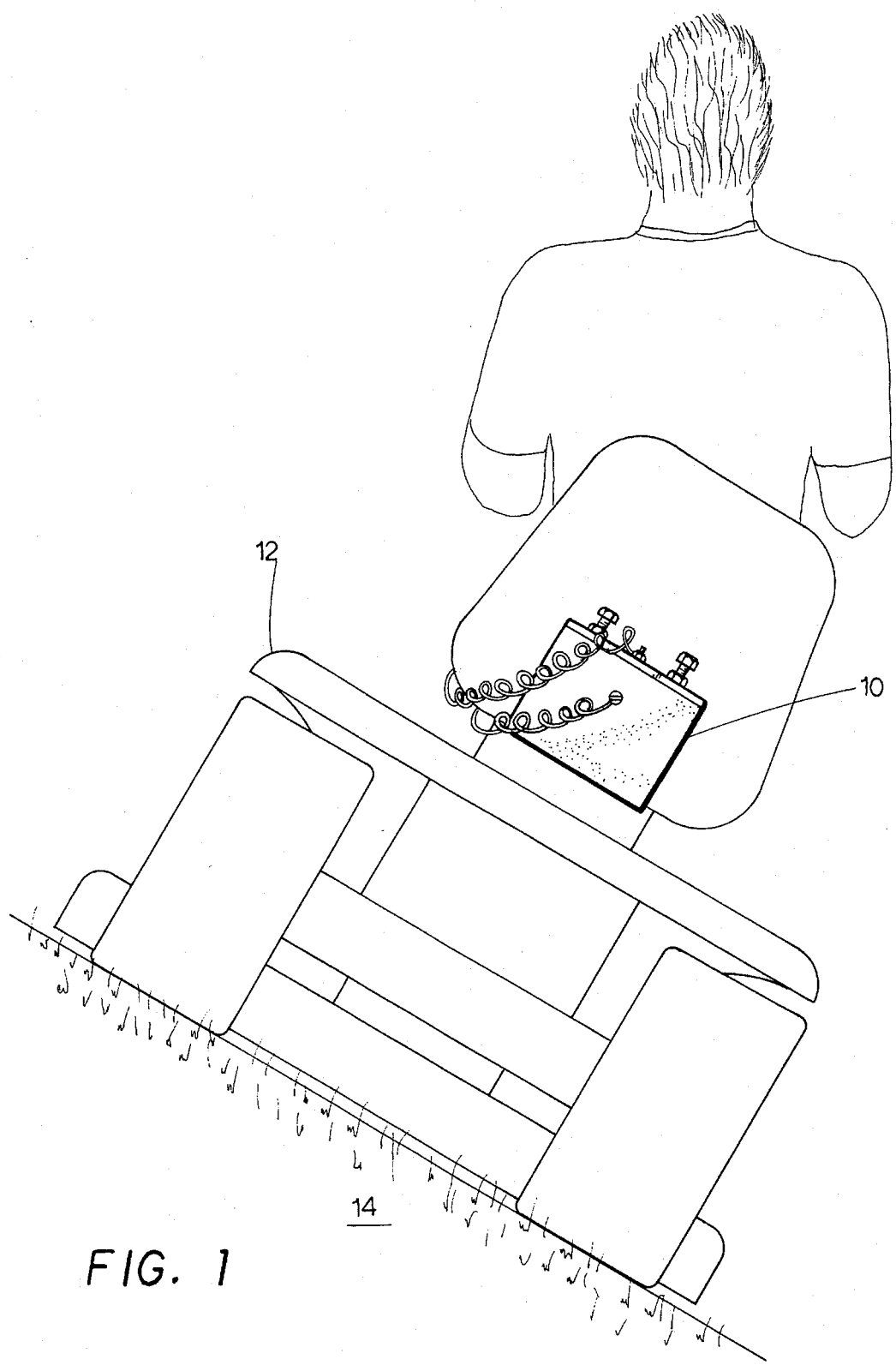
FIG. 1 is an environmental view of the tilt responsive switch of the present invention.

Referring to FIG. 1, the present invention is a vehicle tilt alarm system including at least one tilt responsive switch 10. In the example shown in FIG. 1, the present invention is mounted on a lawn tractor 12.

The angle between the vertical axis and the normal to the plane defined by and tangent to all four tires of the tractor, the aforementioned tangent plane being the one coincident with the ground surface when all four tires are in contact with the ground, will herein be referred to as the tilt angle. When all four wheels are in contact with the surface of embankment 14, it will be appreciated that the tilt angle is equal to the slope of the embankment 14; the slope of the embankment 14 being defined by the angle between the horizontal and the surface of the embankment 14. The tilt angle at which the tractor 12 is in imminent danger of rolling over will herein be referred to as the angle of imminent roll-over.

When a vehicle has to traverse a sloping surface, as in the case of the tractor 12 mowing grass on embankment 14, it is very difficult for the vehicle operator to know a priori whether or not the slope of the embankment approaches or exceeds the angle of imminent roll-over. The difficulty arises because the angle of imminent roll-over varies from vehicle to vehicle depending on the lateral distance between the tires and the height of the center of gravity of the vehicle above the tangent plane mention earlier. Therefore, it is desirable to provide a system to automatically warn the vehicle operator when the tilt angle of his or her vehicle is approaching the angle of imminent roll-over.

Figure 2:
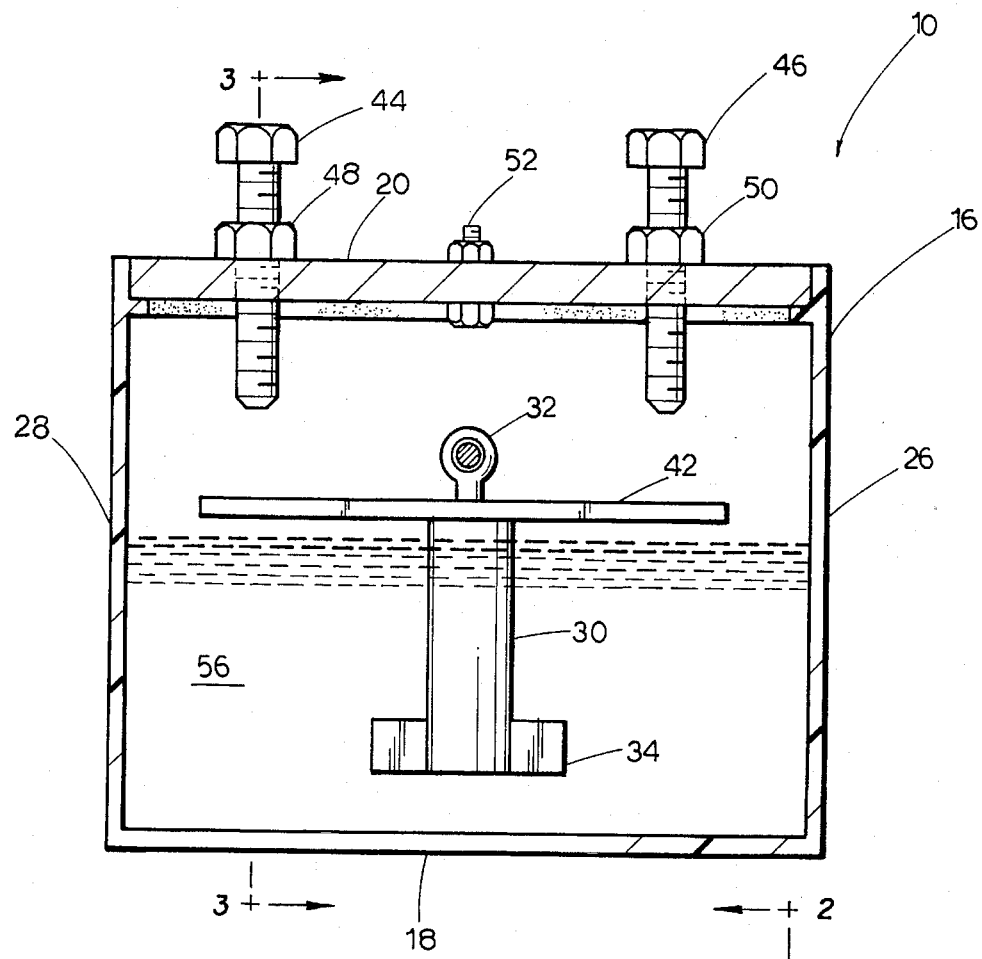
FIG. 2 is a front partial cross sectional view of the tilt responsive switch of the present invention.
Figure 3:
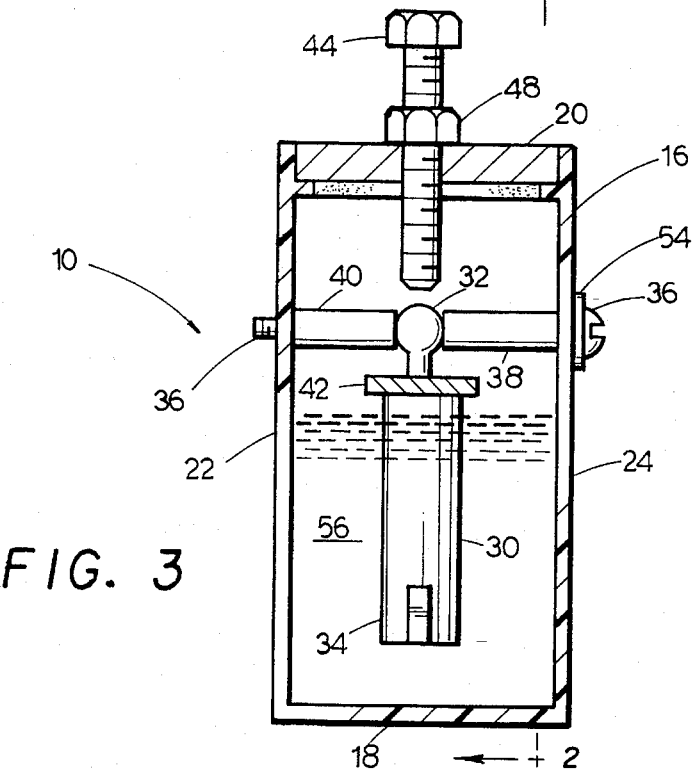
FIG. 3 is a side partial cross sectional view of the tilt responsive switch of the present invention.

FIGS. 2 and 3 show the tilt responsive switch of the present invention in greater detail. The switch 10 includes a housing 16 having a bottom 18, a conductive top 20, a first pair of parallel sides 22 and 24, and a second pair of parallel sides 26 and 28.

A pendulum 30 is pivotally mounted within the housing 16. The pendulum 30 has a pivot end 32 and an enlarged weighted end 34. A bolt 36 pivotally secures the pendulum 30 within the housing 16. Spacers 38 and 40 keep the pendulum 30 from sliding along the bolt 36. A conductive bar 42 is provided near the pivot end 32 of the pendulum 30. The pendulum 30 and the bolt 36 are conductive and preferably metallic. Most preferably the pendulum 30 is made of lead. The bolt 36 is slotted at one end and secured by a nut (not shown) at the other.

The conductive top 20 has two threaded openings that are matingly engaged by bolts 44 and 46. The bolts 44 and 46 are conductive and are secured in place by respective lock-nuts 48 and 50. A conductive fastener 52, comprising a nut and a bolt, is also provided in conductive top 20 for attaching a first electrical lead. A second electrical lead can be attached to the bolt 36, secured in place by being pressed between the slotted head of bolt 36 and the washer 54.

The housing 16 is filled with a light mineral oil 56 whereby the motion of the pendulum 30 is damped by the viscous drag on the pendulum as it moves through the oil.

In operation the housing 16 is fixed to the tractor 12. Therefore, the housing 16 is tilted to the same angle as the tractor 12. The longitudinal axis of the pendulum 30 always aligns with the vertical direction. When the tilt angle is sufficiently high the conductive bar 42 will contact one of the bolts 44 and 46 thereby completing an electrical circuit as will be described below. The tilt angle at which contact between the bar 42 and one of the bolts 44 and 46 is made, can be set by adjusting the protrusion of bolts 44 and 46 into the housing 16.

Figure 4:
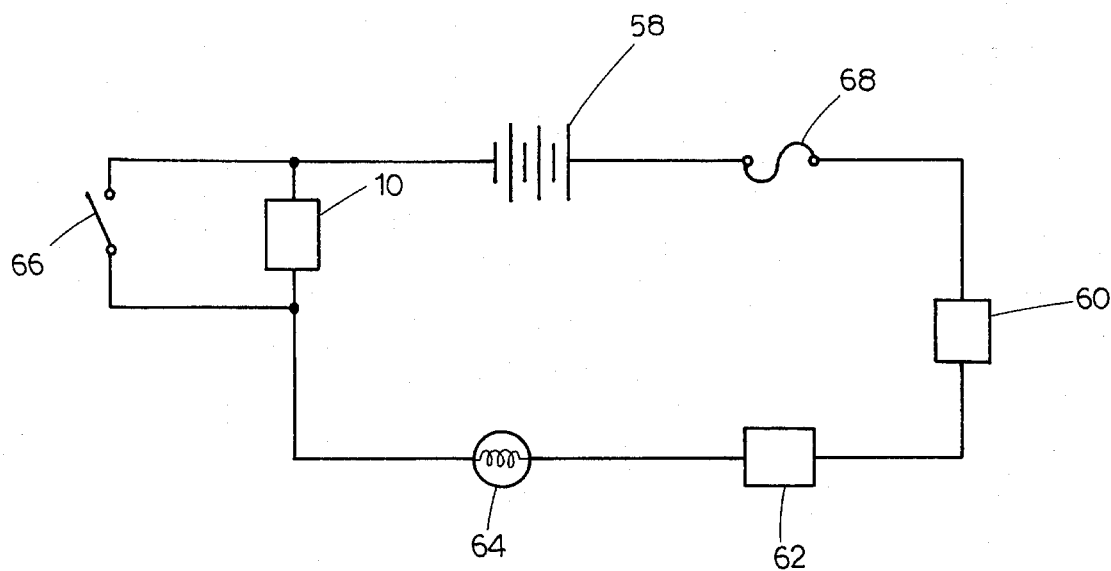
FIG. 4 is a schematic diagram of the vehicle tilt alarm system of the present invention.

FIG. 4 shows the switch 10 employed in a vehicle tilt alarm system. A power supply 58 provides the electrical power to operate alarm devices 60 and 64. The alarm device 60 is preferably a buzzer, the alarm device 64 is a red flashing warning light, and the device 62 is a control circuit, commonly referred to as a flasher, for causing the warning light 64 to flash. Fuse 68 protects the circuit against power surges. Switch 66 is provided for testing the operation of power supply 58, buzzer 60, flasher 62, warning light 64, and fuse 68. In the vehicle tilt alarm system of FIG. 4, switch 10 is set to complete the circuit before the tilt angle reaches the angle of imminent roll-over, activating the various alarm devices when the tilt angle gets dangerously close to the angle of imminent roll-over.

Figure 5:
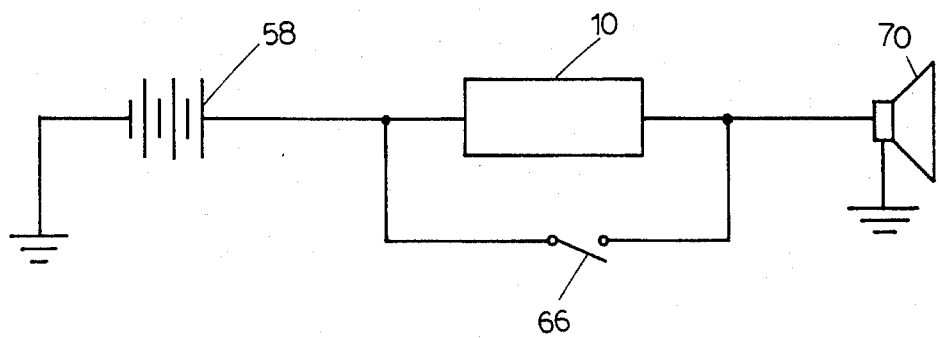
FIG. 5 is a schematic diagram of the vehicle roll-over alert system of the present invention.

FIG. 5 shows the switch 10 used in a vehicle roll-over alert system. Here the switch 10 is set to complete the circuit when the tilt angle exceeds the angle of imminent roll-over. When the switch 10 makes contact, a loud, blaring horn 70 is sounded to summon people in the vicinity to render aid in dealing with the overturned vehicle and in dealing with possible injury to the vehicle operator.

Most preferably a vehicle incorporates both the circuits shown in FIGS. 4 and 5 so that in cases where the operator cannot respond quickly enough to the warnings provided by circuit of FIG. 4, help may be summoned by the sound of the horn 70.

It is to be understood that the present invention is not limited to the sole embodiment described above, but encompasses any and all embodiments within the scope of the following claims.

I claim:

1. A tilt responsive switch comprising:

a housing including a bottom, a conductive top, a first pair of parallel sides being spaced from each other by a first dimension, and a second pair of parallel sides being spaced from each other by a second dimension;

a pendulum having a weighted end and a pivot end, said pendulum having a conductive bar disposed between said weighted end and said pivot end, and said pendulum being pivotally mounted within said housing, whereby said pendulum is free to pivot about a pivot axis passing through said pivot end; and first and second conductive bolts symmetrically disposed on either side of the pivot axis of said pendulum, said conductive bolts matingly engaging respective threaded openings provided in said conductive top, whereby an amount of a protrusion of said first and second conductive bolts into said housing can be set by a user, and tilting said housing, relative to a vertical direction, to a user defined angle will cause an electrically conductive contact between said conductive bar and one of said first and second conductive bolts.

2. The tilt responsive switch according to claim 1, further including a predetermined quantity of oil partially filling said housing so as to submerge a substantial portion of said pendulum, whereby the motion of said pendulum is damped by the viscous drag on said pendulum as said pendulum moves through said oil.

3. The tilt responsive switch according to claim 1, further including:

a fastener provided in said conductive top for attaching a first lead; and a conductive pivot bolt coaxial with said pivot axis, said conductive pivot bolt passing through the pivot end of said pendulum and said first pair of parallel sides, said conductive pivot bolt having means for attaching a second lead, whereby said tilt responsive switch can be connected to an electrical circuit.

4. A vehicle tilt alarm system comprising:

a power supply;

an alarm device provided within an electrical circuit including said power supply; and a tilt responsive switch including:

a housing including a bottom, a conductive top, a first pair of parallel sides being spaced from each other by a first dimension, and a second pair of parallel sides being spaced from each other by a second dimension, a pendulum having a weighted end and a pivot end, said pendulum having a conductive bar disposed between said weighted end and said pivot end, and said pendulum being pivotally mounted within said housing, whereby said pendulum is free to pivot about a pivot axis passing through said pivot end, and first and second conductive bolts symmetrically disposed on either side of the pivot axis of said pendulum, said conductive bolts matingly engaging respective threaded openings provided in said conductive top, whereby an amount of a protrusion of said first and second conductive bolts into said housing can be set by a user, and tilting a vehicle, to which said tilt responsive switch is mounted, to a user defined angle will cause an electrically conductive contact between said conductive bar and one of said first and second conductive bolts thereby activating said alarm device.

5. The vehicle tilt alarm system according to claim 4, wherein said tilt responsive switch further includes a predetermined quantity of oil partially filling said housing so as to submerge a substantial portion of said pendulum, whereby the motion of said pendulum is damped by the viscous drag on said pendulum as said pendulum moves through said oil.

6. The vehicle tilt alarm system according to claim 4, said tilt responsive switch further including:

a fastener provided in said conductive top for attaching a first lead; and a conductive pivot bolt coaxial with said pivot axis, said conductive pivot bolt passing through the pivot end of said pendulum and said first pair of parallel sides, said conductive pivot bolt having means for attaching a second lead, whereby said tilt responsive switch can be connected to an electrical circuit.

7. The vehicle tilt alarm system according to claim 4, wherein said alarm device is a buzzer.

8. The vehicle tilt alarm system according to claim 7, further including a warning light.

9. The vehicle tilt alarm system according to claim 8, wherein said warning light is a flashing light.

10. A vehicle tilt alarm system according to claim 4, wherein said alarm device is a loud horn to alert people in the general vicinity of the vehicle in the event the vehicle rolls over.

* * * * *